(12) United States Patent
Miyata

(10) Patent No.: US 8,351,082 B2
(45) Date of Patent: Jan. 8, 2013

(54) IMAGE PROCESSING APPARATUS, IMAGE FORMING SYSTEM, AND COMPUTER USABLE MEDIUM THEREFOR

(75) Inventor: Yuji Miyata, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 834 days.

(21) Appl. No.: 11/946,924

(22) Filed: Nov. 29, 2007

(65) Prior Publication Data

US 2008/0123156 A1 May 29, 2008

(30) Foreign Application Priority Data

Nov. 29, 2006 (JP) ................. 2006-321580

(51) Int. Cl.
*G06F 15/00* (2006.01)
*H04N 1/40* (2006.01)
*G06K 9/00* (2006.01)
(52) U.S. Cl. ........... 358/2.1; 358/1.9; 382/164; 382/165
(58) Field of Classification Search .................. None
See application file for complete search history.

(56) References Cited

U.S. PATENT DOCUMENTS

| 5,581,667 | A | * | 12/1996 | Bloomberg | 358/1.9 |
| 5,923,821 | A | * | 7/1999 | Birnbaum et al. | 358/1.9 |
| 6,480,622 | B1 | | 11/2002 | Kim | |
| 6,654,145 | B1 | * | 11/2003 | Speck | 358/1.9 |
| 7,009,735 | B2 | * | 3/2006 | Ebner | 358/1.9 |
| 7,206,463 | B2 | * | 4/2007 | Nishide et al. | 382/298 |

FOREIGN PATENT DOCUMENTS

| JP | 05-261941 | 10/1993 |
| JP | 11-341295 | 12/1999 |
| JP | 2001-232858 | 8/2001 |

* cited by examiner

*Primary Examiner* — Twyler Haskins
*Assistant Examiner* — Barbara Reinier
(74) *Attorney, Agent, or Firm* — Banner & Witcoff, Ltd.

(57) ABSTRACT

An image processing apparatus for improved image forming quality is provided. The image processing apparatus includes a storage unit to store image data representing a colored image, an extracting unit to selectively extract objective data representing an object to be formed on a recording medium in a specific color, a modifying unit to modify the extracted objective data to enlarge an area represented by the extracted objective data, and a composition unit to combine the modified objective data with the image data stored in the storage unit.

18 Claims, 11 Drawing Sheets

DRAWING AREA

COMPOSITION AREA

DRAWING AREA      COMPOSITION AREA

DRAWING AREA   COMPOSITION AREA

DRAWING AREA    COMPOSITION AREA

DRAWING AREA

COMPOSITION AREA

DRAWING AREA  COMPOSITION AREA

IMAGE PROCESSING APPARATUS, IMAGE FORMING SYSTEM, AND COMPUTER USABLE MEDIUM THEREFOR

CROSS REFERENCE TO RELATED APPLICATION

As the image generating process starts, in S401, the image drawing area and the composition area are allocated in the RAM 13. In the present embodiment, each of the drawing area and the composition area is configured to have a volume to store data of an image in an equivalent size. In S402, the drawing area and the composition area are painted (initialized) in plain white. FIGS. 5A and 5B are diagrams to schematically illustrate the plain white images stored in the drawing area and the composition area respectively according to the embodiment of the present invention.

BACKGROUND

1. Technical Field

An aspect of the present invention relates to an image processing apparatus, an image forming system, and a computer usable medium therefore, in which color shift in a printed image can be less recognizable effectively.

2. Related Art

In a technical field of an image forming apparatus including a laser printer, color shift, in which a plurality of color inks are undesirably deposited in displaced spots due to a mechanical factor and/or other factors and not overlapped in a same spot to form a dot in an intended color, is considered to be a problem to be overcome. Such color shift may result in undesired blurriness in the image printed, therefore, techniques to offset the color shift have been suggested. In Japanese Patent Provisional Publication H11-341295, for example, outlines in binarized image data are extracted and thickened so that the color shifts occurring in areas near the outlines can be covered in the thickened outlines, and quality of the image can be preferably maintained.

SUMMARY

In this configuration, however, it is noted that the thickening process is applied to every outline in the image. Therefore, the process generally takes long time, which is not beneficial to speeding up an entire printing process. In addition, outlines in areas wherein the color shift offsetting is not specifically effective may be evenly thickened, which is also not beneficial to users.

In view of the above, the present invention is advantageous in that an image processing apparatus, an image forming system, and a computer usable medium therefore, in which color shift in a printed image can be moderated effectively so that quality of the printed image is improved, are provided.

According to an aspect of the invention, there is provided an image processing apparatus. The image processing apparatus includes a storage unit to store image data representing a colored image, an extracting unit to selectively extract objective data representing an object to be formed on a recording medium in a specific color, a modifying unit to modify the extracted objective data to enlarge an area represented by the extracted objective data, and a composition unit to combine the modified objective data with the image data in the storage unit.

According to another aspect of the invention, there is provided an image forming system. The image forming system includes a storage unit to store image data representing a colored image, an extracting unit to selectively extract objective data representing an object to be formed on a recording medium in a specific color, a modifying unit to modify the extracted objective data to enlarge an area represented by the extracted objective data, a composition unit to combine the modified objective data with the image data stored in the storage unit to compose modified image data, and an image forming unit to form a modified colored image, which corresponds to the colored image, on the recording medium according to the modified image data.

According to still another aspect of the invention, there is provided a computer usable medium comprising computer readable instructions. The computer readable instructions controls a computer to process a colored image to be formed on a recording medium by executing steps of storing image data representing the colored image, selectively extracting objective data which represents an object to be formed on the recording medium in a specific color, modifying the extracted objective data to enlarge an area represented by the extracted objective data, and combining the modified objective data with the image data stored in the storage unit to compose modified image data.

According to still another aspect of the invention, there is provided a method for image processing. The method includes steps of storing image data representing a colored image, selectively extracting objective data representing an object to be formed on a recording medium in a specific color, modifying the extracted objective data to enlarge an area represented by the extracted objective data, and combining the modified objective data with the image data being stored.

According to the above configurations, the objects in the specific color which can specifically affect quality of the colored image being formed are selectively enlarged so that color shift in the formed image is preferably and speedily reduced to be less recognizable.

BRIEF DESCRIPTION OF THE ACCOMPANYING DRAWINGS

DETAILED DESCRIPTION

Hereinafter, embodiments according to an aspect of the present invention will be described with reference to the accompanying drawings.

Figure 1:
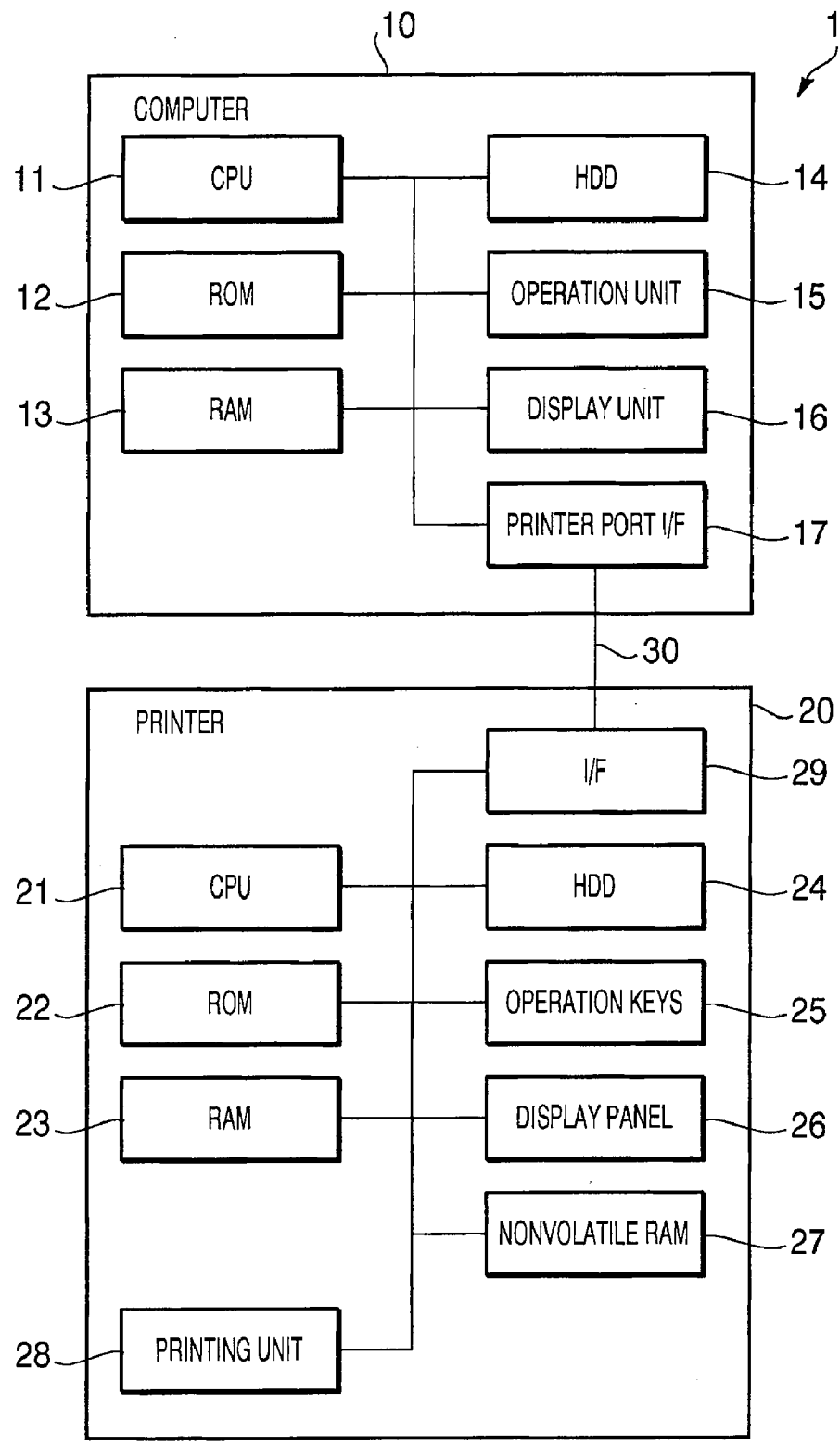
FIG. 1 is a block diagram to illustrate a configuration of an image forming system according to an embodiment of the present invention.

FIG. 1 is a block diagram to illustrate a configuration of an image forming system 1 according to an embodiment of the present invention. The image forming system 1 includes a computer 10, a printer 20, and a communication line 30 to connect the computer 10 and the printer 20.

The computer 10 is configured to be a known personal computer having a CPU 11, a ROM 12, a RAM 13, and an HDD (hard disk drive) 14. Further, an operation unit 15 with various buttons (not shown) and a touch panel (not shown) for user inputs, a display unit 16 with a liquid crystal display (not shown) and lamps (not shown) for indication of various information, and a printer port interface 17 to communicate with the printer 20 are provided.

The printer 20 is configured to be, for example, a color laser printer having a CPU 21, a ROM 22, a RAM 23, an HDD 24, an operation keys 25 including various buttons (not shown) and a touch panel (not shown) for user inputs, a display unit 26 with a liquid crystal display (not shown) for indication of various information, and a nonvolatile RAM 27. Further, an interface 29 to communicate with the computer 10, for example, for receiving print data, and a printing unit 28 to form an image according to obtained print data are provided.

Figure 2:
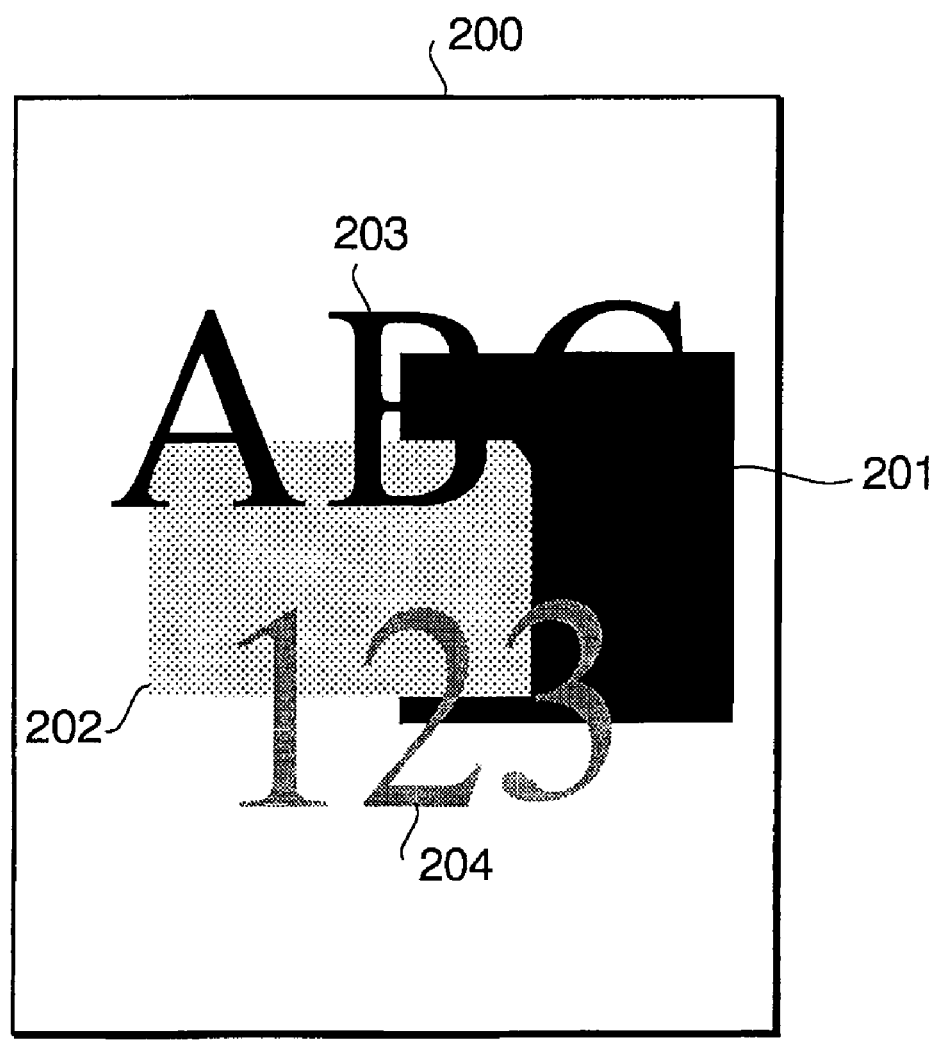
FIG. 2 is a diagram to illustrate an image to be printed in a printer based on image data which is generated in an application program according to the embodiment of the present invention.

FIG. 2 is a diagram to illustrate an image 200 to be printed in the printer 20 based on image data which is generated in an application program according to the embodiment of the present invention. The image 200 includes a black rectangular pattern 201, a neutral-colored rectangular pattern 202, black character string ("ABC") 20, and neutral-colored character string ("123") 204 as objects to be drawn. In the present embodiment, the printer 20 is given print data representing the image 200, which is generated in the computer 10 by using an application program (e.g., word-processing application, image drawing application, etc.), to print. In the present embodiment, the patterns 201, 202, the character string 203, and the character string 204 are formed on a recording medium (not shown) in the order given.

Figure 3:
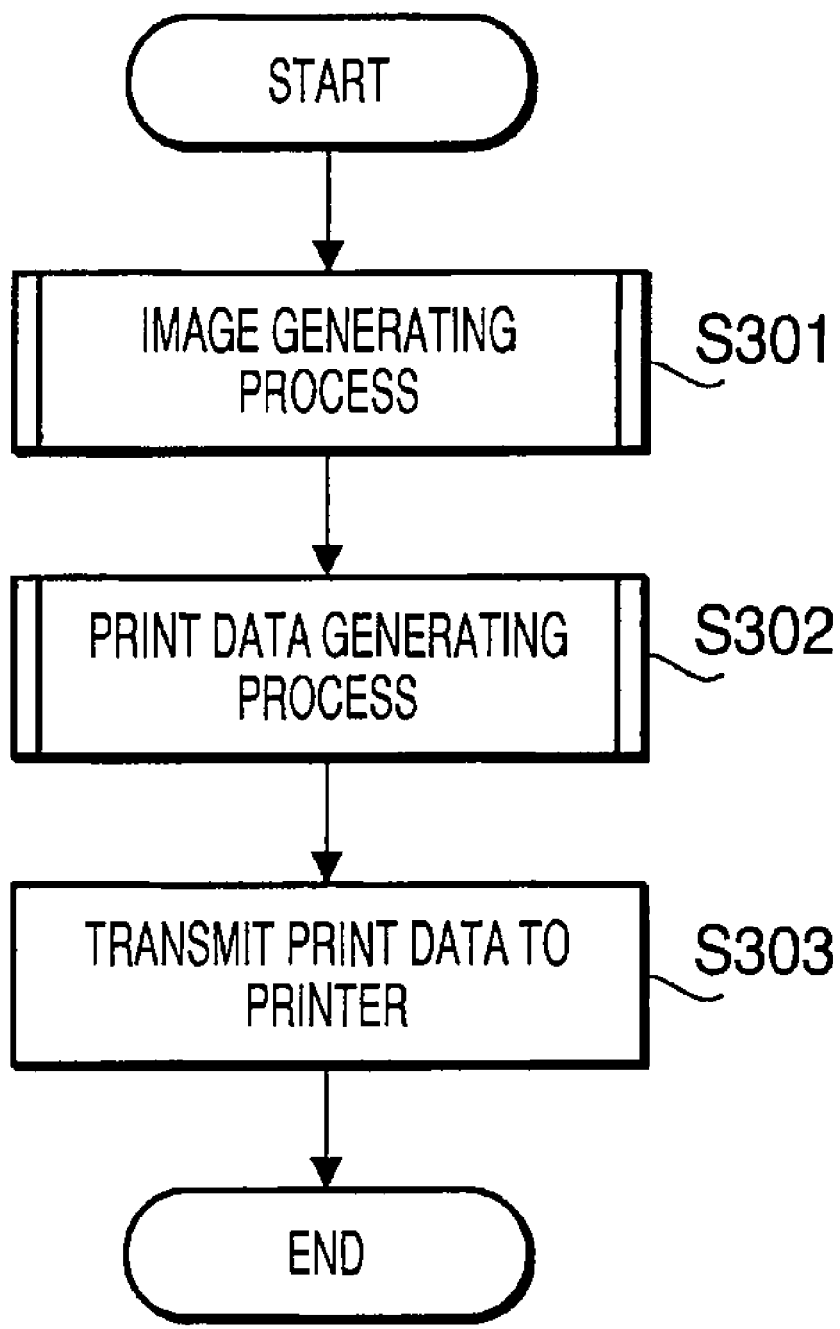
FIG. 3 is a flowchart to illustrate an image processing program according to the embodiment of the present invention.

FIG. 3 is a flowchart to illustrate an image processing program to be executed by the CPU 11 of the computer 10 according to the embodiment of the present invention. The image processing program is included in a printer driver installed in the computer 10 and executed upon issuance of an instruction for image drawing (image-drawing instruction) and obtaining the image data from the application program.

When the image processing program starts, in S301, an image generating process is applied to the image data according to the image-drawing instruction given from the application program. In the image generating process, for example, a character specified in the image-drawing instruction is generated in a drawing area, which is provided in the RAM 13. Following the image generating process in S301, in S302, a print data generating process is executed. In the print data generating process, the image data generated in the image generated process is converted into a format which is usable in the printer 20, for example, by color conversion and binarization. Thereafter, in S303, the generated print data is transmitted to the printer 20 to be printed.

Figure 4:
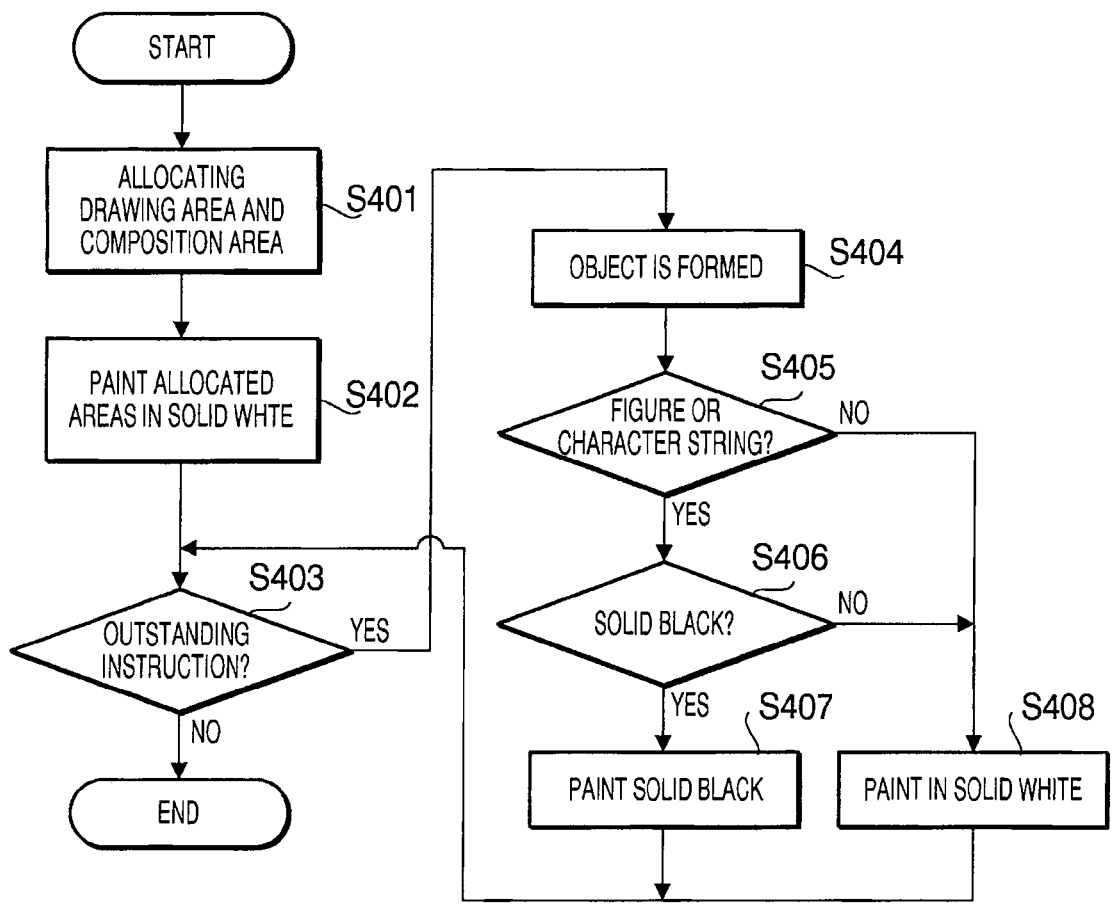
FIG. 4 is a flowchart to illustrate an image generating process according to the embodiment of the present invention.

FIG. 4 is a flowchart to illustrate the image generating process to be executed in S301 in the computer 10 according to the embodiment of the present invention. In the present embodiment, a piece of image data in the RGB (red, green, blue) format is developed according to the image-drawing instruction in work areas allocated in the RAM 13. The work areas include an area for image drawing (drawing area) and an area for image composition (composition area). The drawing area is configured with bitmap data, i.e., a plurality of dots. Each of the dots includes information for R, G, and B, and a data size of the information is 8 bits. The composition area is configured with a plurality of dots, each of which as a data size of 1 bit.

Figure 5A:
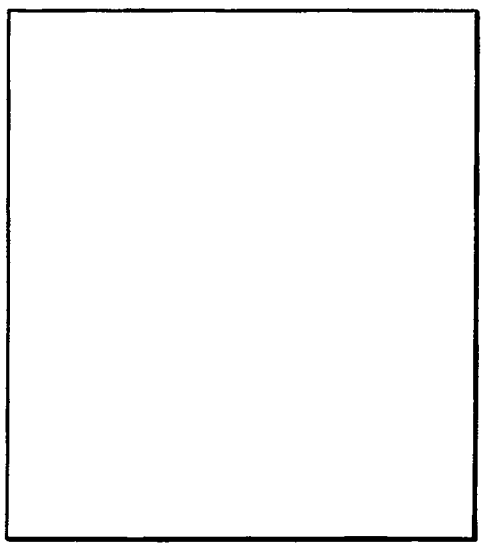
FIGS. 5A and 5B are diagrams to schematically illustrate plane white images stored in a drawing area and a composition area according to the embodiment of the present invention.
Figure 5B:
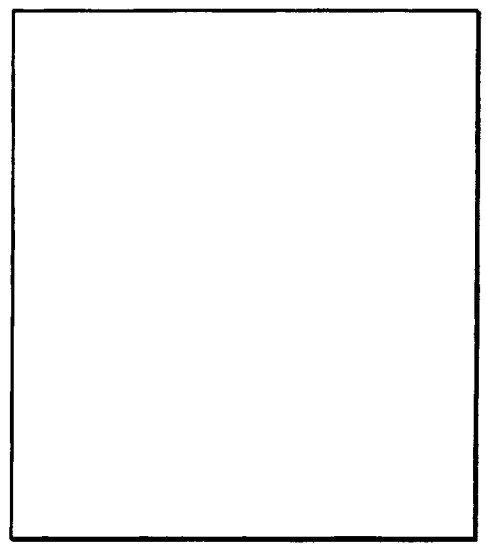

As the image generating process starts, in S401, the image drawing areas and the composition area are allocated in the RAM 13. In the present embodiment, each of the drawing area and the composition area is configured to have a volume to store data of an image in an equivalent size. In S402, the drawing area and the composition area are painted (initialized) in plain white. FIGS. 5A and 5B are diagrams to schematically illustrate the plain white images stored in the drawing area and the composition area respectively according to the embodiment of the present invention.

In S403, it is examined as to whether an outstanding image-drawing instruction for a character string, a graphic figure (vector graphics), or a picture (raster image) given from the application program remains. In the present embodiment, the image-drawing instruction is processed on an object (i.e., character string/graphic figure/picture) basis. Therefore, the following steps S404-S408, which will be described in detail below, are performed on an image-drawing instruction basis. In S403, if it is judged that no outstanding image-drawing instruction remains (S403: NO), the process is terminated. If it is judged that an outstanding image-drawing instruction remains (S403: YES), in S404, the object (character string, graphic figure, or a picture) corresponding to the image-drawing instruction is formed in the drawing area.

In S405, it is examined as to whether the current object to be processed is one of a graphic figure and a character string. In the present embodiment, the image data is configured with any of data representing a graphic figure ("graphic data"), data representing a character string ("character string data"), and data representing a picture ("picture data"). For example, when the current object being processed is picture data, negative judgment is made in S405 (S405: NO).

When the current object to be processed is graphic data or character string data (S405: YES), in S406, it is judged as to whether the object is instructed to be painted in solid black by the image-drawing instruction. In the present embodiment, the first image-drawing instruction is given for the black rectangular pattern 201 (i.e., a figure in solid black), therefore, affirmative judgment is made in S405 and in S406 (S405: YES, S406: YES). The next image-drawing instruction is given for the neutral-colored rectangular pattern (i.e., a figure not in solid black or in white), therefore, affirmative judgment is made in S405, and negative judgment is made in S406 (S405: YES, S406: NO).

Following the affirmative judgment in S406, the object being processed is formed in the composition area, and data corresponding to the object is generated. That is, the object formed in the composition area is painted in solid black (S407).

Following the negative judgment in S405, or following the negative judgment in S406, the current object being processed is formed in the composition area, and data corresponding to the object is generated. That is, the object formed in the composition area is painted in solid white (S408).

Figure 6A:
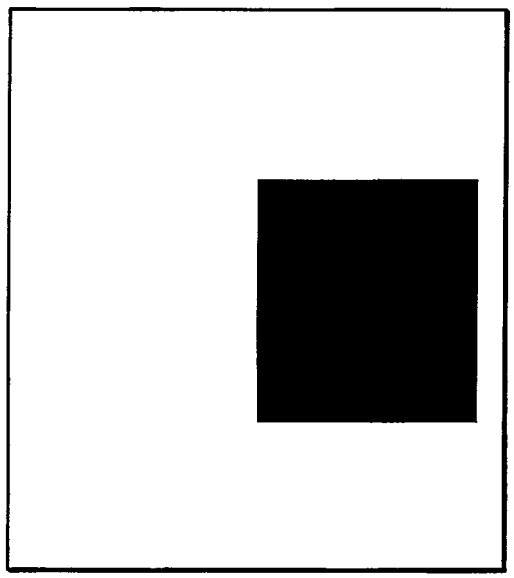
FIGS. 6A and 6B are diagrams to schematically illustrate black rectangular patterns being generated in the drawing area and in the composition area according to the embodiment of the present invention.
Figure 6B:
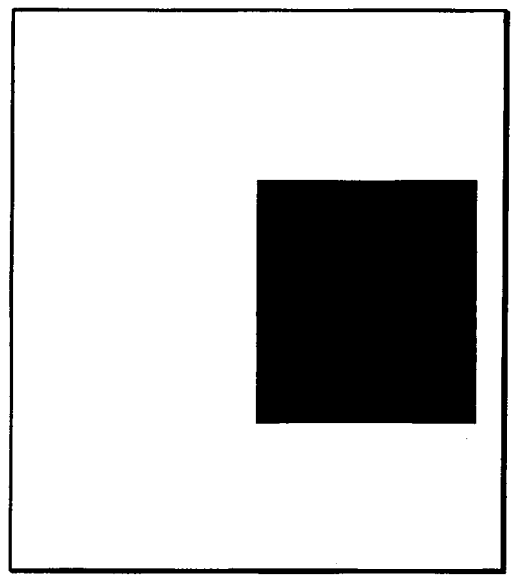

FIGS. 6A and 6B are diagrams to schematically illustrate the black rectangular patterns being generated in the drawing area and in the composition area respectively according to the embodiment of the present invention. When the rectangular pattern is generated in the drawing area as shown in FIG. 6A (S404), the identical rectangular pattern is generated in the composition area as shown in FIG. 6B in a position corresponding to the position of the rectangular pattern being generated in the drawing area (S407).

Figure 7A:
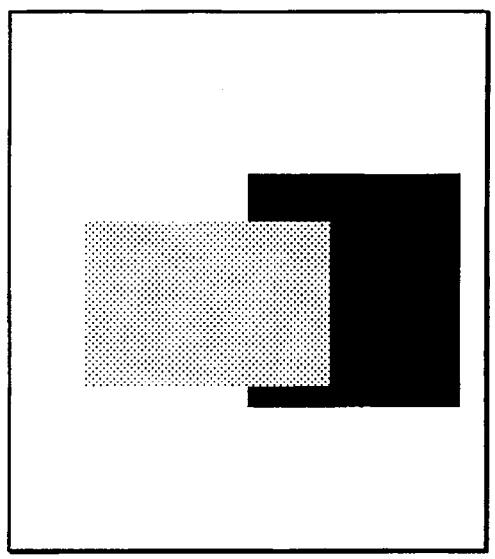
FIGS. 7A and 7B are diagrams to schematically illustrate rectangular patterns in a neutral color being generated in the drawing area and in the composition area according to the embodiment of the present invention.
Figure 7B:
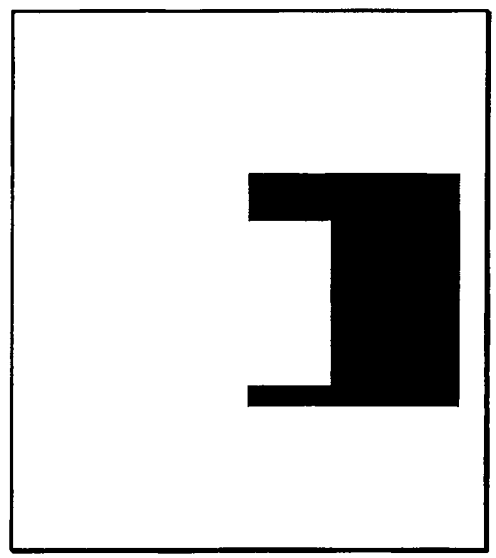

FIGS. 7A and 7B are diagrams to schematically illustrate the neutral-colored rectangular patterns being generated in the drawing area and in the composition area respectively according to the embodiment of the present invention. When the rectangular pattern is generated in the drawing area as shown in FIG. 7A (S404), the identical rectangular shape is generated in the composition area as shown in FIG. 7B (S408), but unlike the rectangular pattern in the drawing area, the rectangular shape in the composition area is painted in white.

Figure 8A:
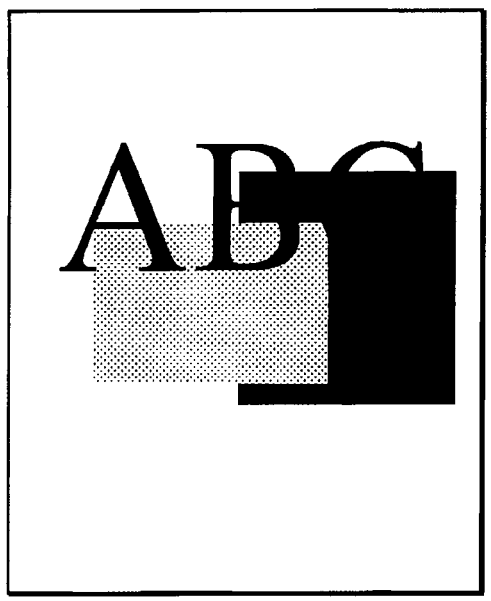
FIGS. 8A and 8B are diagrams to schematically illustrate black character strings being generated in the drawing area and in the composition area according to the embodiment of the present invention.
Figure 8B:
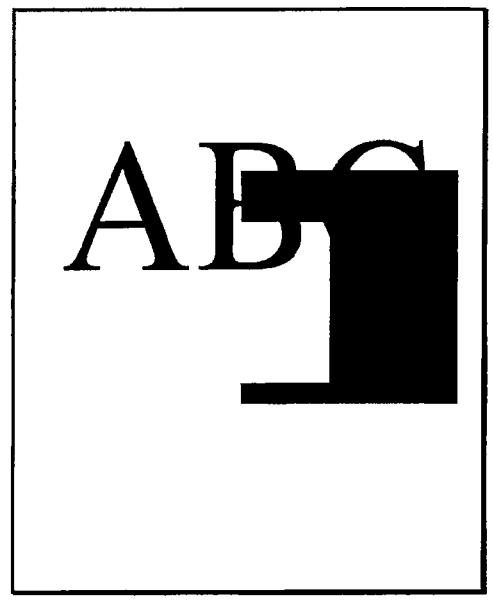

Following the rectangular patterns, the black character strings are generated in the drawing area and the composition area. FIGS. 8A and 8B are diagrams to schematically illustrate the black characters being generated in the drawing area and in the composition area respectively according to the embodiment of the present invention. When the black character string is generated in the drawing area as shown in FIG. 8A (S404), the identical character string is generated in the composition area as shown in FIG. 8B in a position corresponding to the position of the character string being generated in the drawing area (S407).

Figure 9A:
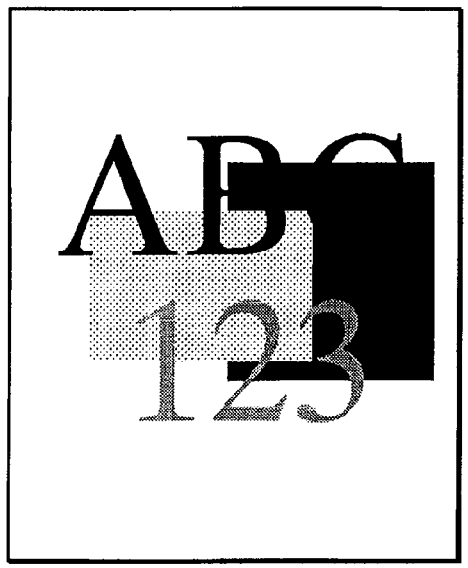
FIGS. 9A and 9B are diagrams to schematically illustrate black characters in a neutral color being generated in the drawing area and in the composition area according to the embodiment of the present invention.
Figure 9B:
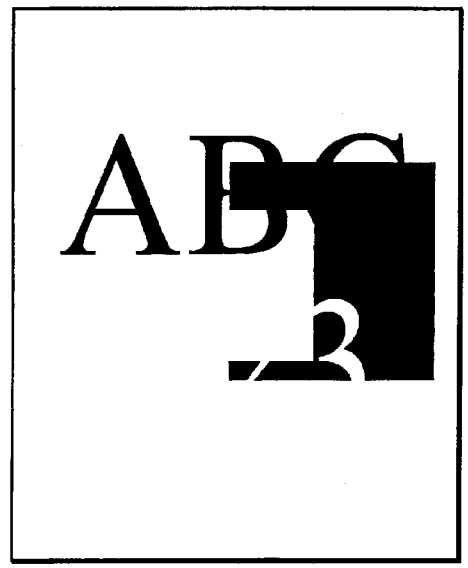

Further, the neutral-colored character strings are generated in the drawing area and the composition area. FIGS. 9A and 9B are diagrams to schematically illustrate the neutral-colored character strings being generated in the drawing area and in the composition area respectively according to the embodiment of the present invention. When the character string is generated in the drawing area as shown in FIG. 9A (S404), the identical rectangular string is generated in the composition area as shown in FIG. 9B (S408), but unlike the character string in the drawing area, the character string in the composition area is painted in white. Thus, when all of the image data representing the image 200 shown in FIG. 2 is finally generated, the black objects as shown in FIG. 9B are composed in the composition area. It is noted that the image generated in the drawing area (see FIG. 9A) is identical to the original image 200 represented by the image data obtained from the application program (see FIG. 2).

Figure 10:
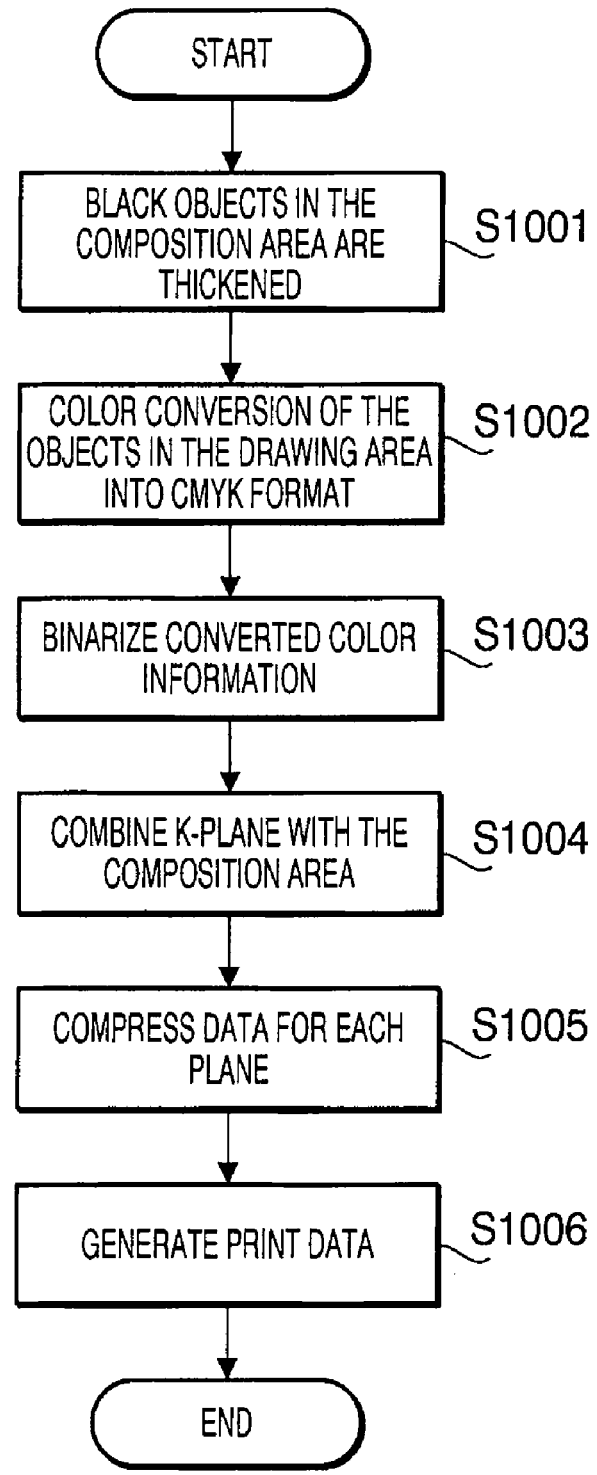
FIG. 10 is a flowchart to illustrate a print data generating process according to the embodiment of the present invention.
Figure 11:
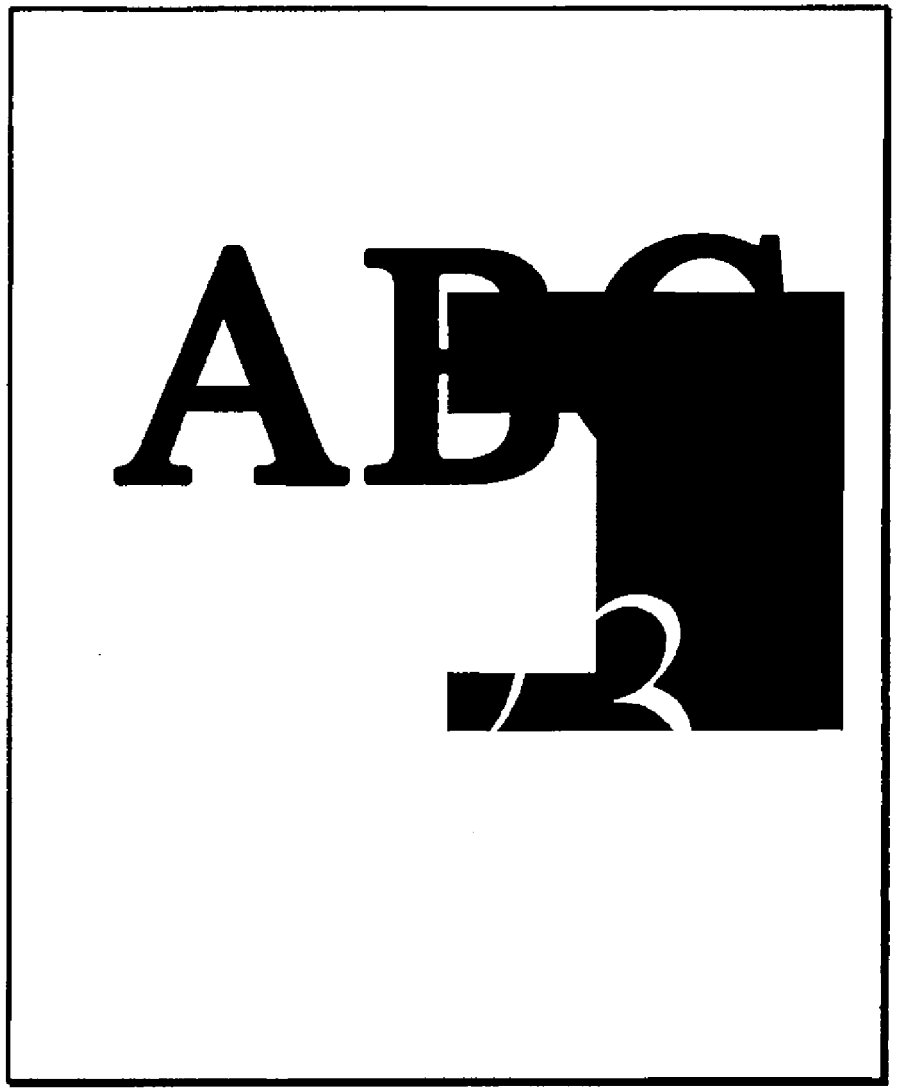
FIG. 11 is a diagram to schematically illustrate black objects in the composition area being thickened according to the embodiment of the present invention.

Next, the print data generating process in S302 will be described. FIG. 10 is a flowchart to illustrate the print data generating process according to the embodiment of the present invention. When the process starts, in S1001, the black objects composed in the composition area are enlarged. It is noted that the black objects are configured with a plurality of black dots, therefore, the black objects can be enlarged (thickened) when dots which are horizontally and vertically adjacent to each of the black dots are painted in black. FIG. 11 is a diagram to schematically illustrate the black objects in the composition area being thickened as above according to the embodiment of the present invention. It should be noted that, when compared with the black objects shown in FIG. 9B, which are before the print data generating process, the black objects shown in FIG. 11 are thickened.

In S1002, color information in the RGB format included in the data generated in the drawing area, which is thus identical to the image data obtained from the application program, is converted into the CMYK (cyan, magenta, yellow, black) format. Thus, the converted color information of the data generated in the drawing data (i.e., C-plane, M-plane, Y-plane, K-plane) is obtained. Thereafter, in S1003, the color information of each plane is binarized. In S1004, among the binarized data for each plane, the binarized data for the K-plane is combined with the data for the thickened black objects, generated in the composition area. That is, the black dots in the thickened areas in the composition area as thickened in S1001 is superposed over the K-plane being binarized in S1003. Thus, the K-plane data for the black objects is regenerated.

Thereafter, in S1005, the data representing each plane is compressed, and in S1006, other data necessary for printing (e.g., PJL (print job language) data, layout command, etc.) is appended to the compressed data to generate print data. The print data as generated above is transmitted to the printer 20 in S303 (see FIG. 3) in the image processing program.

Thus, the image according to the print data with the thickened black objects is formed on the recording medium. In the present embodiment, it is noted that a specific color (i.e., black) which may affect the quality of the printed output in color shift is selectively thickened so that the color shift in black can be thus less recognizable in the thickened areas and the time for the image processing can be shorter.

According to the present embodiment, as thus far described, the color shift which may otherwise occur in vicinity of black objects can be effectively moderated. It is noted that black objects including black character strings and black figures are more frequently used in printed outputs. Therefore, in such cases, it is highly effective to reduce the color shifts in black in the configuration as described above. It is further noted that, in the above configuration, solely the data corresponding to the black objects is processed to reduce the color shift, therefore, it is unnecessary to process the entire image data, which is efficient in process time.

Further, in the present embodiment, data representing the black figures and the black character strings are extracted in order to thicken the areas corresponding to the black figures and the black character strings, and the data representing a picture is not extracted to be thickened. Thus, objective data representing the areas to be thickened can be extracted more easily and speedily compared to a case wherein data representing a picture is extracted. Therefore, the process to reduce the color shift can be simplified and executed in short time.

Although an example of carrying out the invention has been described, those skilled in the art will appreciate that there are numerous variations and permutations of the image processing apparatus and image forming system that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, a color of areas of objects to be thickened is not limited to solid black, but it can be arbitrarily selected. Further, the number of the color of areas to be thickened is not limited to one, but may be a plurality of independent colors.

According to the above embodiment, the computer 10 is configured to execute the image processing program, which is stored in the HDD 14 of the computer 10. However, the printer 20 may be configured to execute the image processing program. In such a case, the printer 20 can be configured to obtain the original image data from the application program and to have the RAM 23 to store the image processing program and the CPU 21 to execute the image processing program.

For another example, in the above embodiment, the printer 20 is configured to be a color laser printer, however, the printer 20 can be replaced with another device having an image forming function such as an MFP (multi-function peripheral) with a facsimile receiving/transmitting function and a scanning function.

Further, a method to thicken the black object areas is not limited to the above configuration. For example, the data for the K-plane can be binarized firstly and the binarized K-plane can be processed to be thickened thereafter.

What is claimed is:

1. An image processing apparatus, comprising:
   a storage unit configured to store image data representing a colored image, the colored image including a plurality of objects, each of which is one of a character string and a graphic figure;
   a processing unit; and
   memory storing computer readable instructions that, when executed by the processing unit, cause the image processing apparatus to provide:
   a judgment unit configured to judge that a specific color for the plurality of objects in the colored image to be painted has been requested;
   an extracting unit configured to extract objective data representing the plurality of objects in the colored image to be formed on a recording medium in the specific color by sequentially painting, using the specific color, the plurality of objects to be formed on the recording medium in the specific color in a composition area, and sequentially painting, using a second color that is different from the specific color, the plurality of objects to be formed on the recording medium in a color different than the specific color in the composition area;
   a modifying unit configured to modify the extracted objective data to enlarge the plurality of objects painted in the composition area after all the objects included in the colored image are painted by the extracting unit; and
   a composition unit configured to combine the modified objective data with the image data stored in the storage unit.

2. The image processing apparatus according to claim 1, wherein the extracting unit selectively extracts the objective data representing each of the objects to be formed on the recording medium in solid black.

3. The image processing apparatus according to claim 1, wherein an area represented by the extracted objective data is enlarged by changing color information of dots adjacent to the area represented by the extracted objective data into color information of the specific color.

4. The image processing apparatus according to claim 1, wherein the specific color is an arbitrary color.

5. An image forming system, comprising:
   a storage unit configured to store image data representing a colored image, the colored image including a plurality of objects, each of which is one of a character string and a graphic figure;
   a processing unit;
   memory storing computer readable instructions that, when executed by the processing unit, cause the image forming system to provide:
   a judgment unit configured to judge that a specific color for the plurality of objects in the colored image to be painted has been requested;
   an extracting unit configured to extract objective data representing the plurality of objects in the colored image to be formed on a recording medium in the specific color by sequentially painting, using the specific color, the plurality of objects to be formed on the recording medium in the specific color in a composition area, and sequentially painting, using a second color that is different from the specific color, the plurality of objects to be formed on the recording medium in a color different than the specific color in the composition area;
   a modifying unit configured to modify the extracted objective data to enlarge the plurality of objects painted in the composition area after all the objects included in the colored image are painted by the extracting unit; and
   a composition unit configured to combine the modified objective data with the image data stored in the storage unit to compose modified image data; and
   an image forming unit configured to form a modified colored image, which corresponds to the colored image, on the recording medium according to the modified image data.

6. The image forming system according to claim 5, wherein the extracting unit selectively extracts the objective data representing each of the objects to be formed on the recording medium in solid black.

7. The image forming system according to claim 5, wherein an area represented by the extracted objective data is enlarged by changing color information of dots adjacent to the area represented by the extracted objective data into color information of the specific color.

8. The image forming system according to claim 5, wherein the specific color is an arbitrary color.

9. A non-transitory computer usable medium comprising computer readable instructions for controlling a computer to process a colored image to be formed on a recording medium by executing steps of:
   storing image data representing the colored image, the colored image including a plurality of objects, each of which is one of a character string and a graphic figure;
   judging that a specific color for the plurality of objects in the colored image to be painted has been requested;
   extracting objective data which represents the plurality of objects in the colored image to be formed on a recording medium in the specific color by sequentially painting, using the specific color, the plurality of objects to be formed on the recording medium in the specific color in a composition area, and sequentially painting, using a second color that is different from the specific color, the plurality of objects to be formed on the recording medium in a color different than the specific color in the composition area;
   modifying the extracted objective data to enlarge the plurality of objects painted in the composition area after all the objects included in the colored image are painted; and
   combining the modified objective data with the image data being stored to compose modified image data.

10. The computer usable medium according to claim 9, wherein the steps to control the computer further include a step of forming a modified colored image, which corresponds to the colored image, on the recording medium according to the modified image data.

11. A method for image processing, comprising steps of:
storing image data representing a colored image, the colored image including a plurality of objects, each of which is one of a character string and a graphic figure;
judging that a specific color for the plurality of objects in the colored image to be painted has been requested;
extracting objective data which represents the plurality of objects in the colored image to be formed on a recording medium in the specific color by sequentially painting, using the specific color, the plurality of objects to be formed on the recording medium in the specific color in a composition area, and sequentially painting, using a second color that is different from the specific color, the plurality of objects to be formed on the recording medium in a color different than the specific color in the composition area;
modifying the extracted objective data to enlarge the plurality of objects painted in the composition area after all the objects included in the colored image are painted; and
combining the modified objective data with the image data being stored.

12. The method according to claim 11, wherein the specific color is solid black.

13. The method according to claim 11, wherein an area represented by the extracted objective data is enlarged by changing color information of dots adjacent to the area represented by the extracted objective data into color information of the specific color.

14. The method according to claim 11, wherein the specific color of the object corresponding to the objective data, which is to be extracted in the extracting step, is an arbitrary color.

15. The image processing apparatus according to claim 1, wherein the second color is white.

16. The image forming system according to claim 5, wherein the second color is white.

17. The computer usable medium according to claim 9, wherein the second color is white.

18. The method according to claim 11, wherein the second color is white.

* * * * *